(12) United States Patent
Wu et al.

(10) Patent No.: US 8,454,060 B2
(45) Date of Patent: Jun. 4, 2013

(54) ELECTRONIC DEVICE WITH COVER-LOCKING MECHANISM

(75) Inventors: Wei Wu, Shenzhen (CN); Xin Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 441 days.

(21) Appl. No.: 12/750,676

(22) Filed: Mar. 30, 2010

(65) Prior Publication Data

US 2011/0134611 A1 Jun. 9, 2011

(30) Foreign Application Priority Data

Dec. 8, 2009 (CN) .......................... 2009 1 0311046

(51) Int. Cl.
*E05C 19/10* (2006.01)
*G06F 1/16* (2006.01)
*H05K 5/00* (2006.01)
*H05K 7/00* (2006.01)

(52) U.S. Cl.
USPC .... 292/95; 292/116; 361/679.57; 361/679.58

(58) Field of Classification Search
USPC ............................................ 292/121, 1, 194
See application file for complete search history.

(56) References Cited

U.S. PATENT DOCUMENTS

| 4,838,624 | A  | * | 6/1989  | Walla ............................ 312/221 |
| 7,173,816 | B2 | * | 2/2007  | Song ......................... 361/679.06 |
| 7,261,331 | B2 | * | 8/2007  | Lin ................................. 292/116 |
| 7,835,150 | B2 | * | 11/2010 | Degner et al. ............. 361/679.58 |
| 7,986,524 | B2 | * | 7/2011  | Dong et al. ................ 361/679.55 |
| 8,085,532 | B2 | * | 12/2011 | Tseng ....................... 361/679.58 |
| 2005/0168924 | A1 | * | 8/2005 | Wu et al. ....................... 361/683 |

* cited by examiner

*Primary Examiner* — Carlos Lugo
*Assistant Examiner* — Faria Ahmad
(74) *Attorney, Agent, or Firm* — Altis Law Group, Inc.

(57) ABSTRACT

An electronic device is provided. The electronic device includes a main body, a first cover, a second cover, a rotating member, a sliding member, and a pushing member. The main body includes a first guiding member. The second cover includes a first connecting member. The rotating member includes a driving member. The sliding member includes a slot and a first converting member. The slot cooperates with the driving member. The pushing member includes a second guiding member, a second converting member and a locking post. The second guiding member cooperates with the first guiding member, and the locking post cooperates with the first connecting member. When the second guiding member is pushed to the second position, the locking post disengages from the first connecting member. When the second guiding member is pushed from the second position to the third position, the second cover moves to an open position.

5 Claims, 6 Drawing Sheets

ELECTRONIC DEVICE WITH COVER-LOCKING MECHANISM

BACKGROUND

1. Technical Field

The disclosure relates to electronic devices and, particularly, to an electronic device having a cover-locking mechanism.

2. Description of Related Art

Adding new hardware to or performing maintenance on a computer often requires accessing hardware components inside the housing of the computer by removing several screws attaching a cover to the housing. During the process of removing the screws with a tool, mishandling of the tool or the cover may result in damage to the computer.

Therefore, it is desirable to provide an electronic device to overcome the described limitations.

BRIEF DESCRIPTION OF THE DRAWINGS

The components in the drawings are not necessarily drawn to scale, the emphasis instead being placed upon clearly illustrating the principles of the electronic device with a cover-locking mechanism. Moreover, in the drawings, like reference numerals designate corresponding parts throughout the several views.

DETAILED DESCRIPTION

Figure 1:
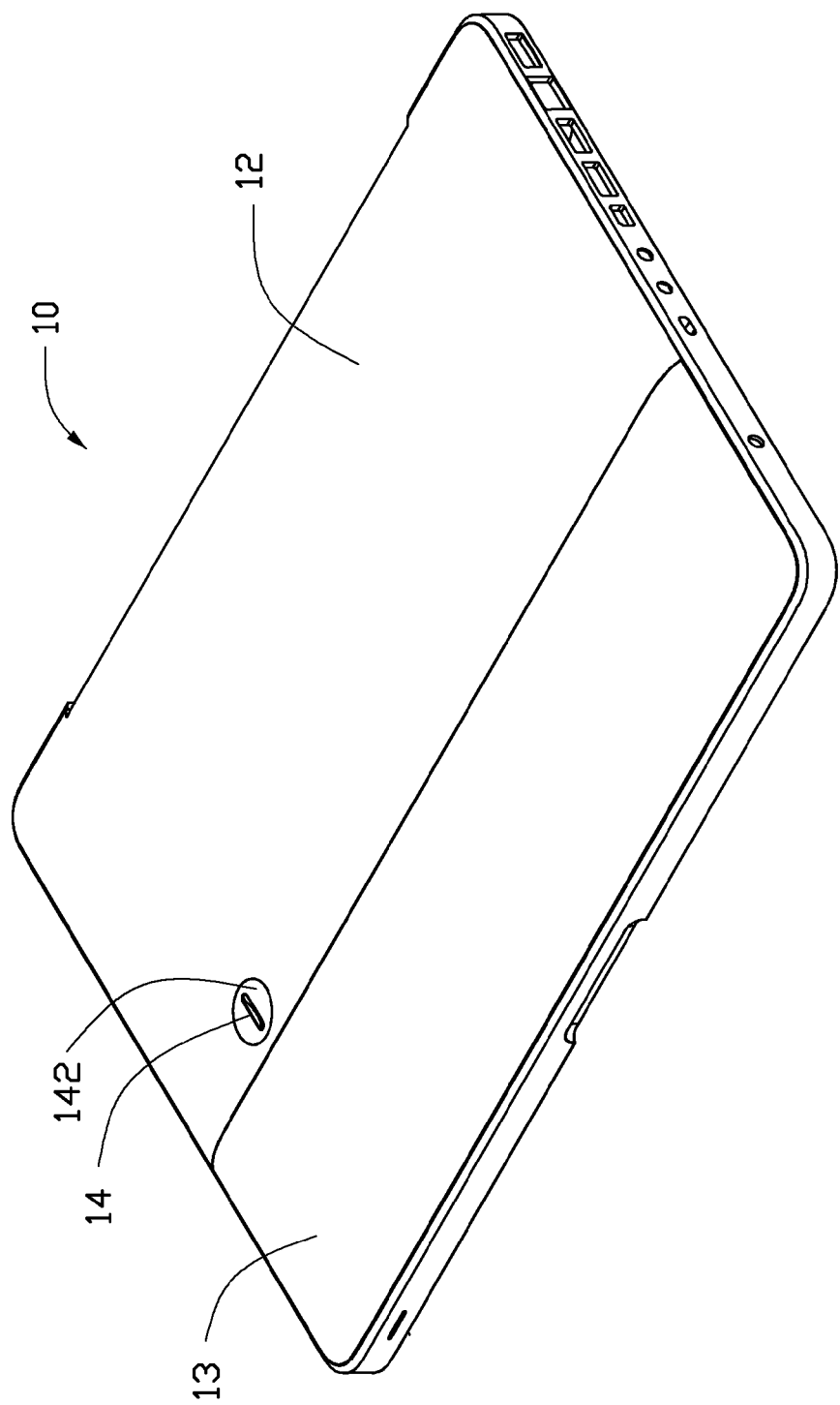
FIG. 1 is a perspective view of an electronic device with a cover-locking mechanism in accordance with an exemplary embodiment.
Figure 2:
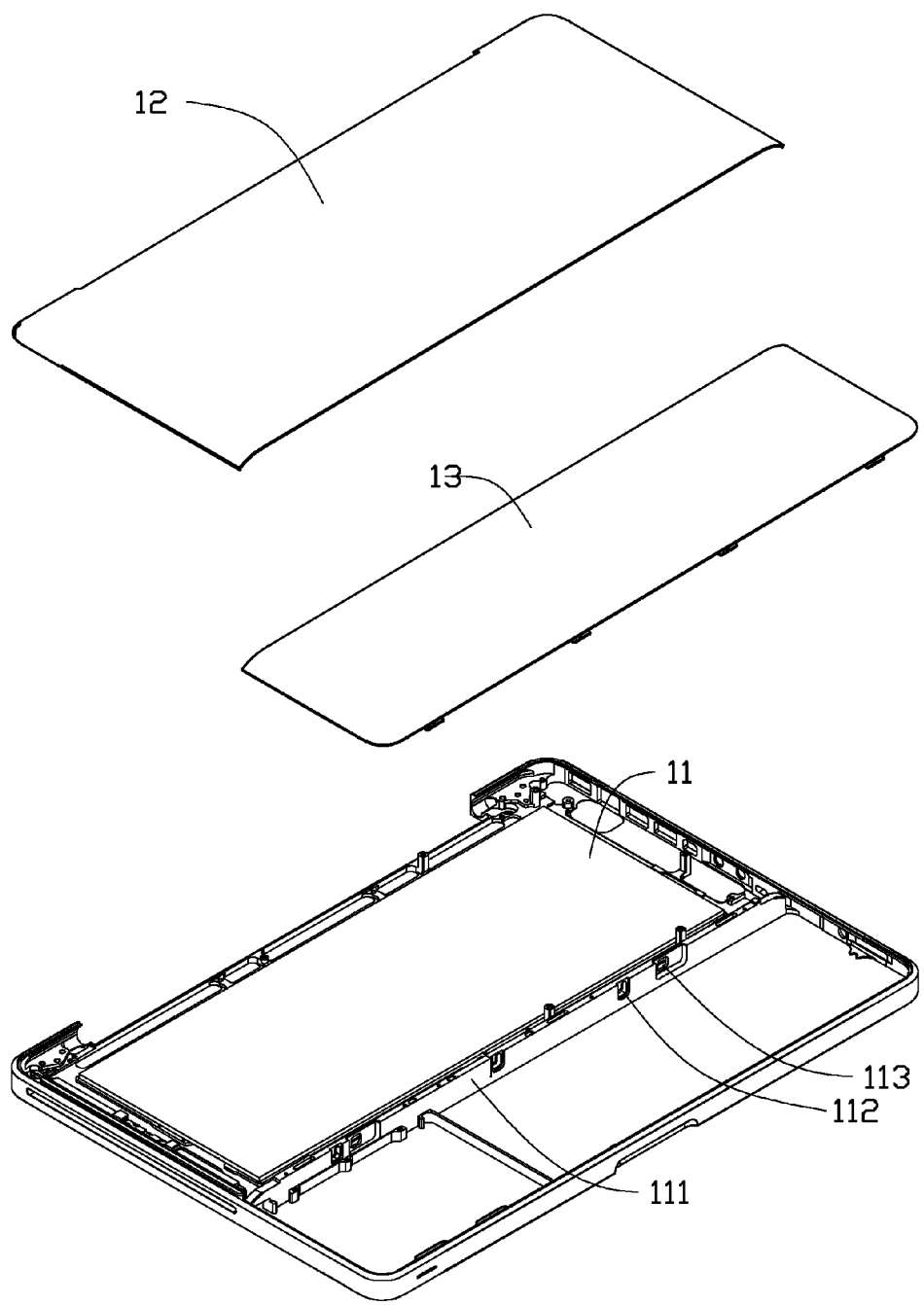
FIG. 2 is an exploded view of the electronic device of FIG. 1.
Figure 3:
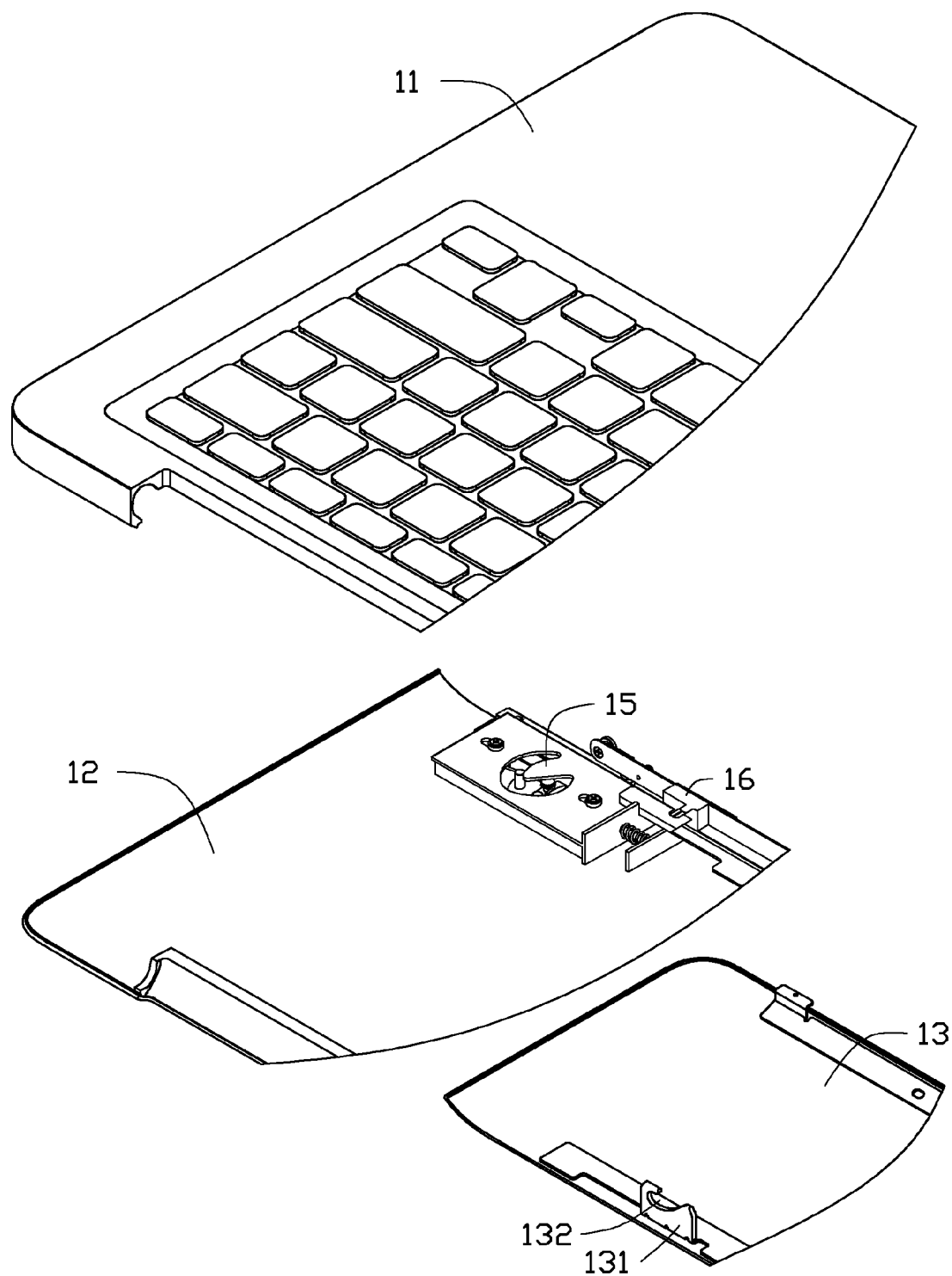
FIG. 3 is a partial, exploded view of the electronic device of FIG. 1, which is viewed from another perspective with certain components omitted for clarity.
Figure 4:
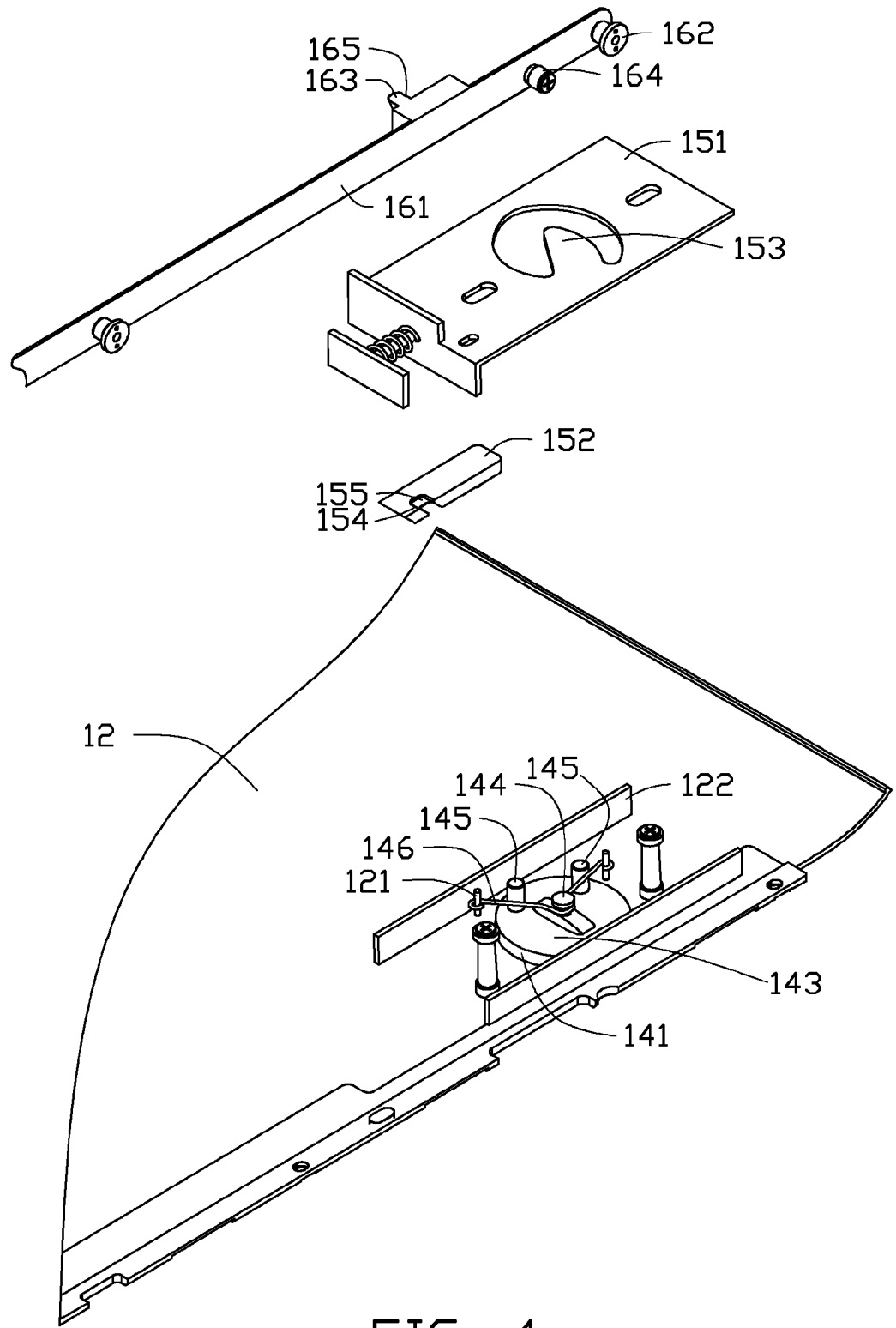
FIG. 4 is a partial, exploded view of the first cover of the electronic device with the cover-locking mechanism of FIG. 1.

Referring to FIGS. 1 and 2, an electronic device 10 includes a main body 11, a first cover 12, and a second cover 13. The first cover 12 is securely attached to the main body 11. The second cover 13 is removably attached to the main body 11. A rotating member 14 is rotatably connected to the first cover 12. The rotating member 14 is manipulable by a user to detach the second cover 13 from the main body 11.

Referring to FIGS. 3 to 6, the electronic device 10 further includes a sliding member 15 and a pushing member 16, which cooperate with the rotating member 14 to form a latching mechanism. The sliding member 15 and the pushing member 16 are slidably connected to the first cover 12.

A frame 111 (see FIG. 2) is formed on the inner surface of the first cover 12. The frame 111 includes a first guiding member 112 and a limitation hole 113. The first guiding member 112 includes a first slot 114 and a second slot 115. The first slot 114 is in connection with the second slot 115, together with the second slot 115 forming an L-shaped slot. In the embodiment, the first slot 114 and the second slot 115 are substantially perpendicular to each other. The limitation hole 113 is formed adjacent the first guiding member 112.

Two pillars 121 and a supporting plate 122 are securely connected to the inner surface of the first cover 12. The supporting plate 122 protrudes vertically from the first cover 12. The second cover 13 includes a first connecting member 131, by which the first cover 12 is removably connected to the main body 11. In the embodiment, the first connecting member 131 includes a hook 132.

The rotating member 14 includes a driving member 141, which includes a top surface 142 (see FIG. 1) with a slot defined therein and a bottom surface 143 opposite to the top surface 142. A tool such as a screw driver can be used to engage the slot to rotate the driving member 141. A post 144 extends from the bottom surface 143 of the driving member 141. Two driving members 145 are formed on the bottom surface 143, which are spaced from each other and are positioned away from the rotating axis of the rotating member 14. In the embodiment, the height of the driving member 145 is higher than that of the supporting plate 122.

There are two springs 146 in the electronic device 10. One end of each spring 146 is attached to the post 144, and the other end of each spring 146 is attached to a corresponding pillar 121, respectively. When the driving member 145 rotates, one of the springs 146 elastically deforms. Such that the deformed spring 146 can provide a spring force after the rotating member 14 is rotated, and thus causes the rotating member 14 to return to an initial position.

The sliding member 15 is slidably connected to the supporting plate 122. The sliding member 15 is used to convert the rotating movement of the driving member 145 to the sliding movement of the pushing member 16. In the exemplary embodiment, the sliding member 15 includes a base plate 151 and a sliding plate 152. The base plate 151 is slidably connected to the sliding plate 152.

A C-shaped slot 153 is defined in the base plate 151. Each driving member 145 can abut against and move along sides of the slot 153 to convert the rotating movement of the rotating member 14 to a sliding movement of the pushing member 16.

The sliding plate 152 includes a first converting member 154. In the embodiment, the first converting member 154 defines a groove 155. The groove 155 is bent inward from one edge of the sliding plate 152, and the groove 155 slopes with respect to the sliding plate 152. Movement of the sliding member 15 in the groove 155 drives the pushing member 16 to move.

The pushing member 16 is slidably connected to the first cover 12, which includes a base plate 161, a second guiding member 162, a second converting member 163, and a locking post 164. The second guiding member 162, the second converting member 163, and the locking post 164 are installed on the base plate 161. The second guiding member 162 is placed in the first guiding member 112, and moves along the first slot 114 and the second slot 115 to guide the movement of the locking post 164. The second converting member 163 is a sloped protrusion 165 that slopes with respect to the inner surface of the first cover 12. The second converting member 163 is placed in the first converting member 154, and the groove 155 engages the sloped protrusion 165 to convert the movement of the sliding member 15 to the movement of the pushing member 16. The locking post 164 is placed in the first connecting member 131 through the limitation hole 113.

Figure 5:
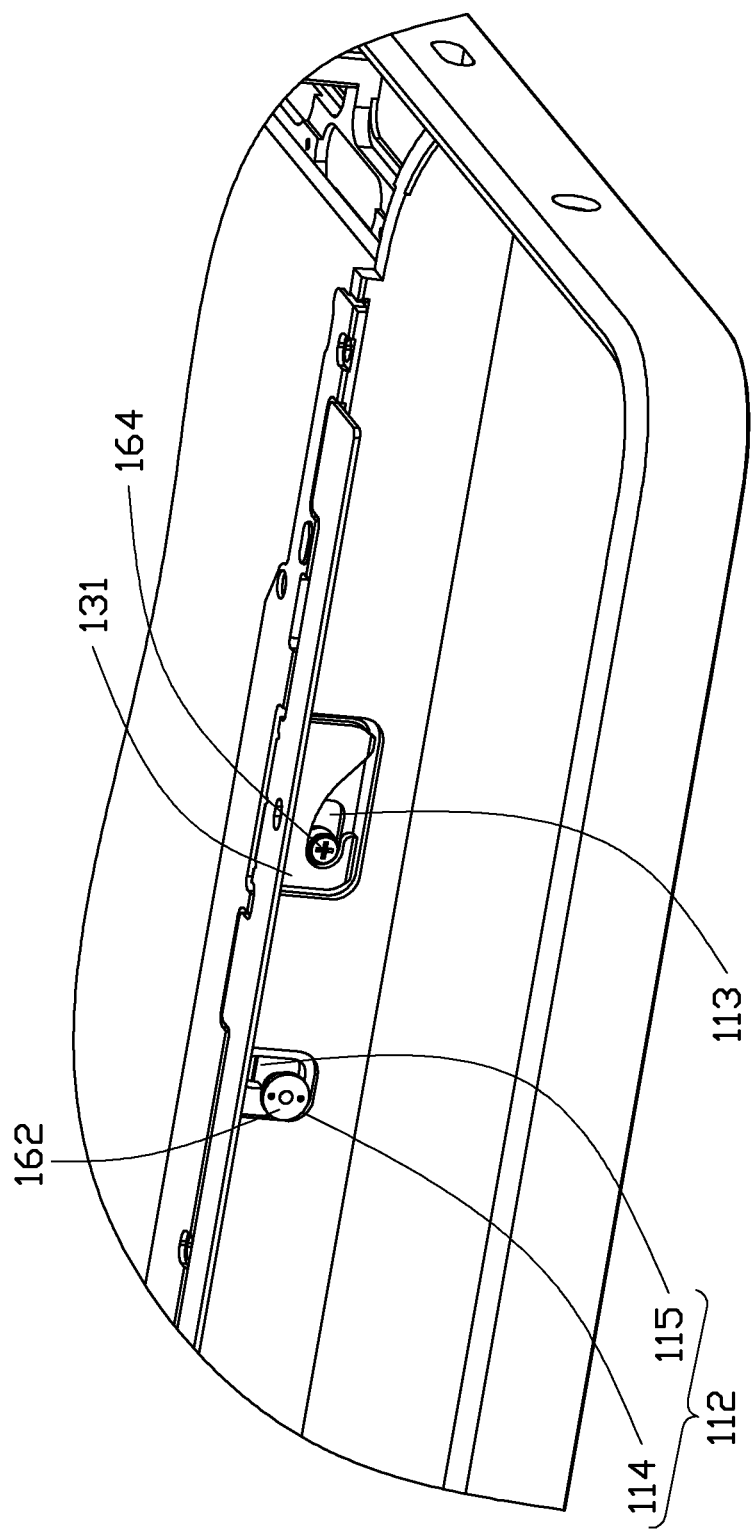
FIG. 5 is a partial, perspective view of the electronic device of FIG. 1, which shows an initial state view of the locking post of the first cover and a second guiding member.

In the initial state, the second guiding member 162 is in the first position (see FIG. 5). In the embodiment, the first position means the second guiding member 162 is in the first slot 114 of the first guiding member 112, and the locking post 164 is in the first connecting member 131, which engages the hook 132 to attach the cover to the main body 11.

Figure 6:
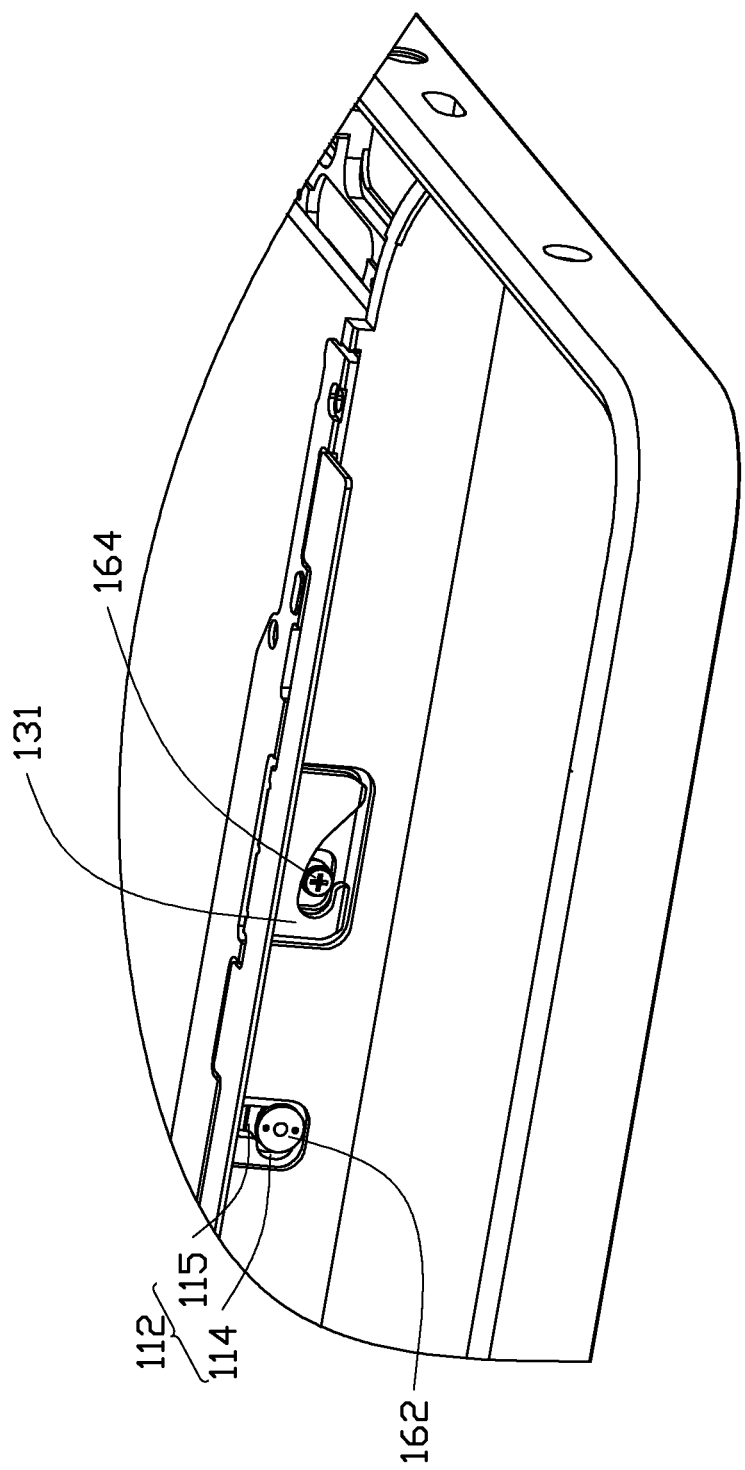
FIG. 6 is a partial, perspective view of the electronic device of FIG. 1, which shows a working state of the locking post of the first cover and the second guiding member.

Referring to FIG. 6, when the user turns the rotating member 14, the driving member 145 stretches the spring 146. When the driving member 145 rotates to a predetermined position, where the driving member 145 touches the slot 153, the slot 153 is moved by the driving member 145. The base plate 151 moves in the first direction to drive the sliding plate 152 to move in the first direction. Because the second converting member 163 is now in the first converting member 154 and the second guiding member 162 is in the first position, the second converting member 163 moves in the first direction to drive the second guiding member 162 to move in the first direction, then the locking post 164 disengages from the first connecting member 131.

When the second guiding member 162 moves to the second position, the second guiding member 162 is in the intersection of the first slot 114 and the second slot 115, and continues rotating the rotating member 14, the driving member 145 drives the slot 153 and continues stretching the spring 146, and the slot 153 moves toward the first position. Because the first converting member 154 is now in the second converting member 163 and the second guiding member 162 is in the second position, the second converting member 163 moves in the second direction to drive the second guiding member 162 and the locking post 164 to move in the second direction. When the second guiding member 162 moves to the third position, namely the second guiding member 162 is in the second slot 115 of the first guiding member 112, the second cover 13 moves from the initial position to an open position under the driving of the locking post 164.

When rotation of the rotating member 14 stops, the first cover 12 is moved by rebounding of the spring 146. For the same reason, the second guiding member 162 and the locking post 164 move in the second direction. When the second guiding member 162 moves to the second position, the second guiding member 162 and the locking post 164 stop moving. When the second cover 13 needs to be connected to the main body 11, the user pushes the second cover 13 down. The sliding member 15 and the pushing member 16 will be in the initial position under the driving of the hook 132 of the first connecting member 131.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. An electronic device, comprising:
a main body;
a first cover securely connected to the main body;
a second cover comprising a first connecting member, the second cover connected to the main body via the first connecting member;
a frame fixed to an inner surface of the main body, the frame comprising a first guiding member;
a rotating member rotatably connected to the first cover and comprising a driving member positioned away from a rotating axis of the rotating member;
a sliding member slidably connected to the first cover and comprising a slot and a first converting member, the slot cooperating with the driving member of the rotating member to convert rotation of the rotating member to a sliding movement of the sliding member along a first direction; and
a pushing member slidably connected to the first cover and comprising a second guiding member, a second converting member and a locking post, the second guiding member cooperating with the first guiding member to limit the pushing member to move along the first direction and a second direction perpendicular to the first direction, the second converting member cooperating with the first converting member to convert the movement of the sliding member along the first direction to the movement of the pushing member along the first direction and the second direction; the locking post cooperating with the first connecting member to keep the second cover in an initial position;
wherein when the second guiding member moves from a first position to a second position along the first direction by the driving of the sliding member, the locking post disengages from the first connecting member; when the second guiding member moves from the second position to a third position along the second direction by the driving of the sliding member, the second cover moves from the initial position to an open position by the driving of the locking post;
wherein the electronic device further comprises two springs; the rotating member comprises a driving member, a top surface of the driving member is external to the first cover and defines a slot for being operated by an external force to rotate the rotating member, a post formed on a bottom surface of the driving member; two pillars fixed on the inner surface of the first cover; one end of each spring is connected to the post, the other end of each spring is connected to a corresponding one of the pillars to provide an elastic deformation to cause the rotating member to return to the initial position.

2. The electronic device of claim 1, wherein the first connecting member comprises a hook capable of engaging with the locking post to attach the second cover to the main body.

3. The electronic device of claim 1, wherein the first guiding member comprises a first slot and a second slot, the first slot is in connection with the second slot, the first and second slots together form an L-shaped slot, and the first slot is perpendicular to the second slot to guide the movement of the second guiding member.

4. The electronic device of claim 1, wherein the sliding member comprises a base plate, the slot of the sliding member is formed in the base plate, the slot is C-shaped; the driving member abuts against and moves along sides of the slot to convert the rotating movement of the rotating member to the sliding movement of the sliding member.

5. The electronic device of claim 4, further comprising a sliding plate, wherein the sliding plate is connected to the base plate, the first converting member is installed on the sliding plate, the first converting member defines a groove, which slopes with respect to the sliding plate; the second converting member is a sloped protrusion that slopes with respect to the inner surface of the first cover, and the groove engages the sloped protrusion to convert the sliding movement of the sliding member to the sliding movement along the first direction and the second direction of the pushing member.

* * * * *